(12) United States Patent
Schmid et al.

(10) Patent No.: US 6,463,857 B1
(45) Date of Patent: Oct. 15, 2002

(54) IGNITION DEVICE FOR TRIGGERING A RESTRAINING DEVICE

(75) Inventors: Günther Schmid, Götzis; Helmut Fabing, Rankweil, both of (AT)

(73) Assignee: Hirschmann Austria GmbH, Rankweil (AT)

( * ) Notice: Subject to any disclaimer, the term of this patent is extended or adjusted under 35 U.S.C. 154(b) by 0 days.

(21) Appl. No.: 09/715,939

(22) Filed: Nov. 17, 2000

(30) Foreign Application Priority Data

Nov. 22, 1999 (AT) ............................................. 1978/99

(51) Int. Cl.⁷ .................................................. F42B 3/12
(52) U.S. Cl. ............... 102/530; 102/202.9; 102/202.14; 102/202.7; 102/202.1
(58) Field of Search ........................... 102/202.9, 202.7, 102/530, 531, 202.14, 202.1

(56) References Cited

U.S. PATENT DOCUMENTS

| | | | | |
|---|---|---|---|---|
| 4,110,813 A | * | 8/1978 | Hoheisel et al. | ......... 102/202.9 |
| 5,269,560 A | * | 12/1993 | O'Loughlin et al. | ........ 102/531 |
| 5,433,147 A | * | 7/1995 | Brede et al. | ................ 102/530 |
| 5,929,516 A | | 7/1999 | Heerman et al. | |
| 6,073,963 A | * | 6/2000 | Hamilton et al. | ........... 102/531 |
| 6,126,197 A | * | 10/2000 | Muir et al. | |
| 6,129,560 A | * | 10/2000 | Baur et al. | |
| 6,166,452 A | * | 12/2000 | Adams et al. | |
| 6,203,342 B1 | * | 3/2001 | Gauker et al. | |
| 6,227,115 B1 | * | 5/2001 | Gruber et al. | .............. 102/530 |
| 6,257,617 B1 | * | 7/2001 | McFarland et al. | |
| 6,276,953 B1 | * | 8/2001 | Gauker et al. | |

FOREIGN PATENT DOCUMENTS

| | | | |
|---|---|---|---|
| AT | 000522 | 12/1995 | |
| DE | 196 10 799 C1 | 9/1997 | |
| DE | 197 12 314 A1 | 10/1998 | |
| DE | 198 56 325 A1 | 6/2000 | |
| DE | 19856325 A1 | * 6/2000 | ................ 102/530 |
| EP | 0805074 | 11/1997 | |
| WO | 0009366 | 2/2000 | |

OTHER PUBLICATIONS

Third International Congress "Molded Interconnect Devices", Sep. 23–24, 1998, Erlangen, Germany (ISBN 3–87525–111–3).

* cited by examiner

Primary Examiner—Charles T. Jordan
Assistant Examiner—Lulit Semunegus
(74) Attorney, Agent, or Firm—Friedrich Kueffner

(57) ABSTRACT

An ignition device for triggering a restraining device of a motor vehicle has a MID support having a forward end and a rearward end. Electronic components are mounted on the MID support. An ignitor is arranged at the forward end of the MID support. The MID support has at least one unitary connector pin having at least one metallized area configured to contact the electronic components.

13 Claims, 2 Drawing Sheets

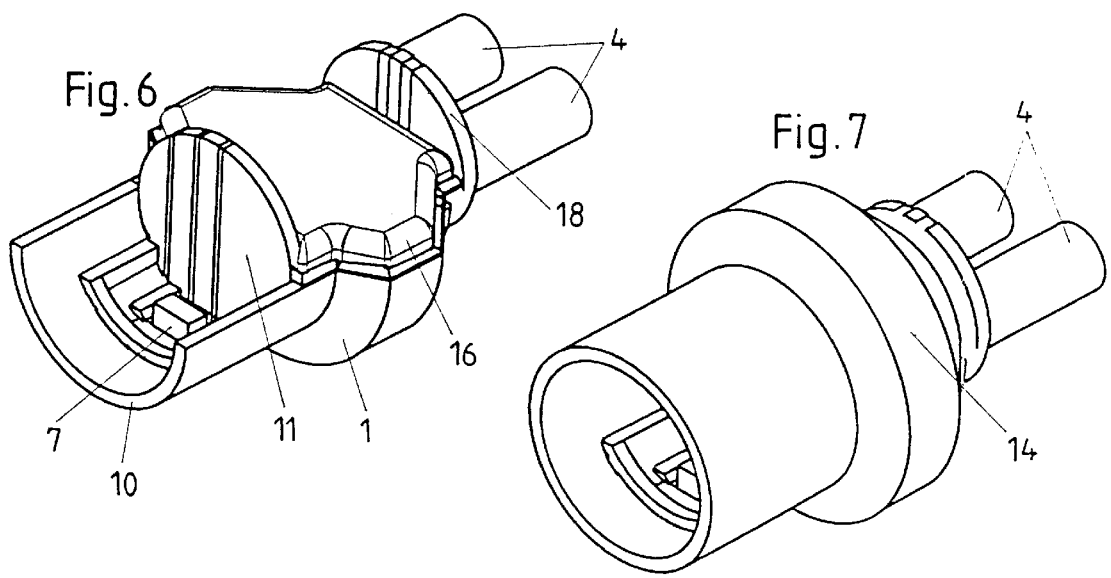
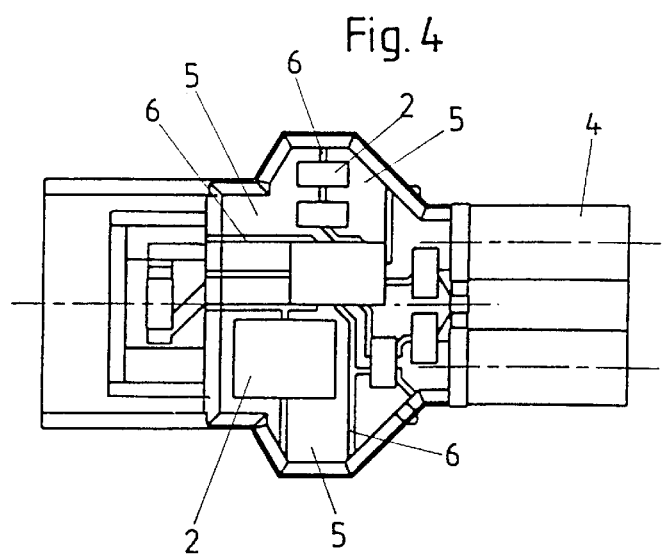
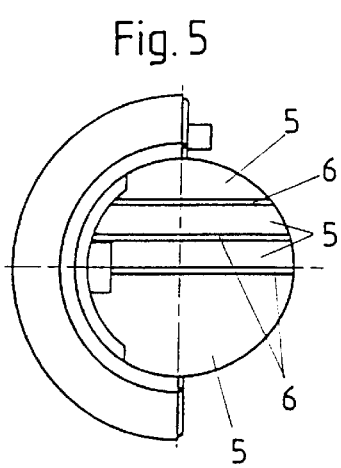
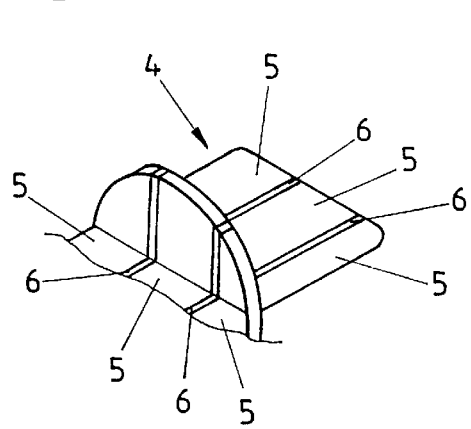
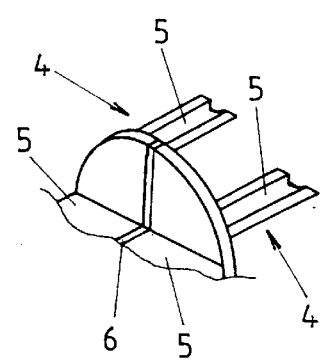

IGNITION DEVICE FOR TRIGGERING A RESTRAINING DEVICE

BACKGROUND OF THE INVENTION

1. Field of the Invention

The invention relates to an ignition device in a motor vehicle for triggering a restraining device, in particular, a seat belt tightening device or airbags, wherein the ignition device in the area of its forward end has an ignitor, such as an ignition cap or an ignition resistor arranged in a powder chamber filled with a powder, as well as electronic components which are arranged on a MID support.

2. Description of the Related Art

An ignition device which is installed in a drive device for a restraining device of a motor vehicle is known, for example, from AT 000 522 U1. For preventing ignition misfires, the ignition device has electronic components, in particular, inductive resistors, which are freely soldered to the supply wires of the ignition device for supplying the ignition energy and are embedded in plastic material by injection molding or by casting. The employed electronic components are relatively robust components such as inductive resistors.

From German patent DE 196 10 799 C1 an ignition device of the aforementioned kind is known in which semiconductor components in the form of integrated circuits are used also. The electronic components can be mounted on a MID support (MID=molded interconnects device). Such supports are, for example, produced in a two-step injection molding process wherein a base member of a first plastic material component is embedded in a second plastic material component by injection molding and one of the two plastic material components can be provided by an electrochemical electroplating process with a surface metallization while the other of the two plastic material components does not accept such a metallization by electroplating. The metallization by electroplating is provided for forming strip conductors which contact and connect the electronic components to be provided on the MID support.

Other methods for manufacturing MID supports are known: for example, so-called photo imaging technologies or film technologies. These technologies are, for example, described in the proceedings of the Third International Congress "Molded Interconnect Devices", Sep. 23–24, 1998, Erlangen, Germany (ISBN 3-87525-111-3). In each case, strip conductors are arranged on the injection-molded base body.

SUMMARY OF THE INVENTION

It is an object of the present invention to provide an improved ignition device of the aforementioned kind whose manufacture, in comparison to that of the ignition device known from German patent DE 196 10 799 C1, is simplified.

In accordance with the present invention, this is achieved in that the MID support has at least one connector pin which is formed as a unitary part of the MID support and which is provided with at least one metallized area for contacting the electronic components.

In the ignition device according to the invention the one or more connector pins for contacting the ignition device are thus embedded by injection molding during the manufacture of the MID support and are then provided with a corresponding metallization or metallized areas by electroplating which provide the contact surfaces.

In a preferred embodiment of the ignition device according to the invention at least a part of the wall of the powder chamber is also formed by injection molding during the manufacture of the MID support and is formed as a unitary part thereof.

For completing the ignition device, optionally after embedding the electronic components in a sealing component, a further plastic material component is advantageously connected by injection molding to the MID support. This further plastic material component can be a soft plastic material component which forms a sealing bead extending about the outer periphery of the ignition device.

BRIEF DESCRIPTION OF THE DRAWING

In the drawing:

FIG. 4 is a plan view of the MID support of FIG. 2;

FIG. 5 is a front view of the MID support of FIG. 2;

FIG. 6 shows a first stage of the manufacturing process of the ignition device of FIG. 1 in a perspective view corresponding to that of FIG. 2;

FIG. 7 shows a second stage of the manufacturing process of the ignition device of FIG. 1 in a view corresponding to that of FIG. 6;

FIG. 11 shows another embodiment of the connector pins of the ignition device;

FIG. 12 shows yet another embodiment of the connector pins of the ignition device.

DESCRIPTION OF THE PREFERRED EMBODIMENTS

Figure 1:
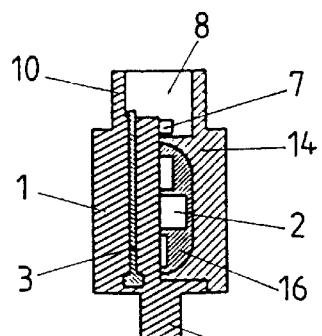
FIG. 1 is a schematic longitudinal section of a first embodiment of the invention.

The ignition device according to the invention illustrated in FIGS. 1 through 8 has an MID support 1 on which electronic components are arranged some of which are identified by reference numeral 2. These electronic components 2 comprise, inter alia, semiconductor components in the form of integrated circuits. In this way, an electronic bus device can be formed for connecting the ignition device to a data bus system via which commands for triggering the ignition device can be transmitted.

The MID support 1 according to the illustrated embodiment comprises at least two plastic material components which are joined to one another by injection molding in a two-step (or multi-step) injection molding process. One of the plastic material components is provided on its surface with a metallization by means of an electrochemical electroplating process. These metallized areas can be used for forming strip conductors which contact electronic components 2 and connect them correspondingly with one another. The other plastic material component cannot be metallized by this electrochemical electroplating process and forms insulating areas at the surface of the MID support which, for example, are positioned between the strip conductors formed by the electroplating metallization process. Several metallized areas and insulating areas on the surface of the MID support are indicated in the Figures with the reference numerals 5 and 6.

At the backside of the support connector pins 4 are formed as unitary parts of the MID support and are comprised of the plastic material component that is metallizable by electroplating. Each of the connector pins 4 is covered at its surface at least partially by a metallization (metal coating) and connected correspondingly via metallized areas 5 with the electronic components 2.

At its forward end the ignition device has a powder chamber 8 in which an ignition resistor 7 is arranged. The powder chamber is filled with an ignitable powder (not illustrated in the Figures) and is closed at its front side by a membrane 9. The lower part 10 of the sidewall as well as the back wall 11 of the powder chamber 8 are formed by the MID support. In the area of the wall of the powder chamber 8 formed by the MID support the ignition resistor 7 is arranged and connected correspondingly by metallized areas 5 with the electronic components 2.

After the manufacture of the MID support with its metallized areas 5 and the attachment of the electronic components 2 onto the MID support, the electronic components are embedded in a sealing compound 16, as illustrated in FIG. 6. Subsequently, the thus finished ignition device is then introduced into an injection mold and is embedded in a further plastic material component so as to be provided with the shape illustrated in FIG. 7. For finishing the ignition device the ignition powder is filled into the powder chamber 8 and the powder chamber 8 is closed at its front side by the membrane 9 (see FIG. 8).

The closure of the powder chamber 8 at the front side can also be realized by a cap or a protective lacquer applied thereto. Moreover, the pyrotechnical material to be introduced into the powder chamber 8 can also be an initially liquid pyrotechnical material, comprised of two components to be mixed with one another, which subsequently hardens (cures). An additional forward closure of the powder chamber 8 can then be completely eliminated. The hardened or cured pyrotechnical material is moisture-resistant. Such hardenable pyrotechnical materials are known. Other pyrotechnical materials of different consistency can also be used in this context.

The ignition device according to the invention can also be provided with a heat conducting device 3. Such a heat conducting device 3 is provided for increasing the transport safety of the ignition device. Should a fire occur during the transport of the ignition device, it would be possible that the ignition device is heated first at its backside. Without such a heat conducting device 3, the support of the ignition device could become so instable as a result of exposure to heat that, when finally the ignition of the powder in the powder chamber 8 occurs, parts of the housing are thrown off. In the longitudinal section illustrated in FIG. 1, a heat conducting device in the form of a metal pin is provided which extends from the area of the rearward end of the ignition device into the powder chamber. In addition or instead, as illustrated in FIGS. 2 to 5, a large-surface metallization of the surface of the MID support could be provided. The term large-surface metallization is to be understood such that the metallized area 5 of the surface of the MID support 1 has a substantially greater surface area than the insulating areas 6 arranged inbetween. These large-surface area metallized portions 5 result in a considerable increase of the heat conductivity of the rearward area of the ignition device into the powder chamber 8. In order to further increase the heat conductivity from the rearward area of the ignition device into the powder chamber 8 a continuously metallized area could be provided which extends from the rearward portion of the ignition device into the powder chamber.

Figure 9:
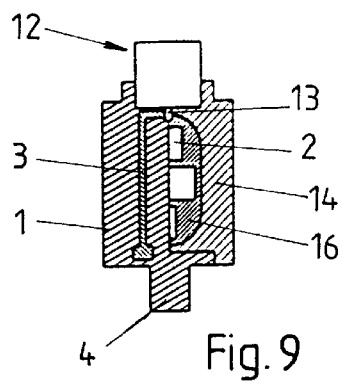
FIG. 9 is a schematic longitudinal section of a third embodiment of the ignition device according to the invention.

In the further embodiment of the invention illustrated in FIG. 9, a conventional ignition cap 12 is provided instead of the powder chamber 8. Its connecting wires 13 are connected with the metallized areas on the surface of the MID support 1. The injection-molded encasement 14 with its further plastic material component encloses also the rearward area of the ignition cap 12. A heat conducting device 3 in the form of a metal pin extends from the area of the rearward end of the ignition device to the connecting wire 13 of the ignition cap 12 with which it is connected.

Figure 10:
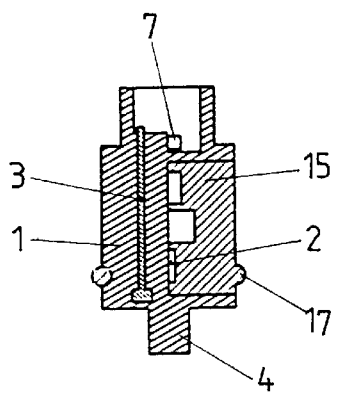
FIG. 10 is a schematic longitudinal sectional view of a fourth embodiment of the ignition device according to the invention.
Figure 8:
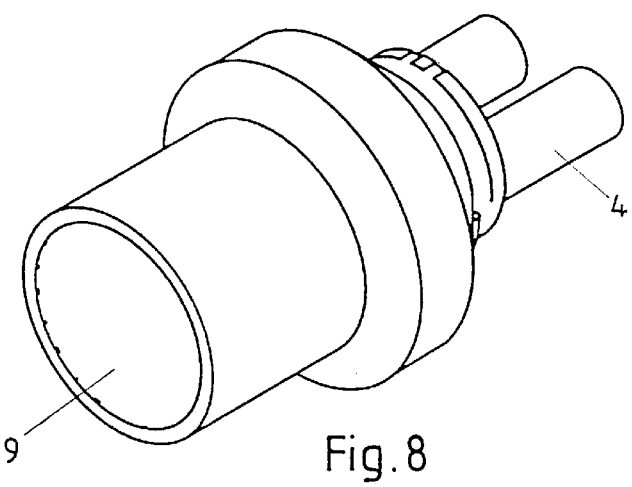
FIG. 8 shows a third stage of the manufacturing process of the ignition device of FIG. 1 in a view corresponding to that of FIG. 6.
Figure 2:
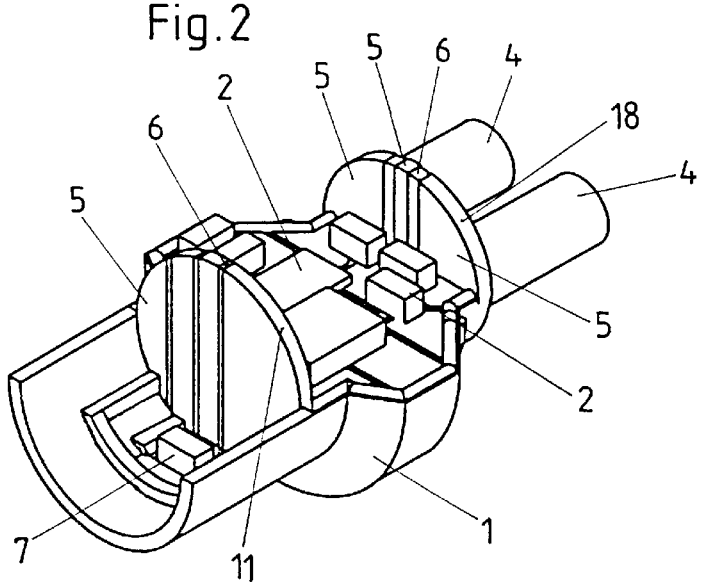
FIG. 2 is an enlarged perspective illustration from above of the MID support of the ignition device of FIG. 1.
Figure 3:
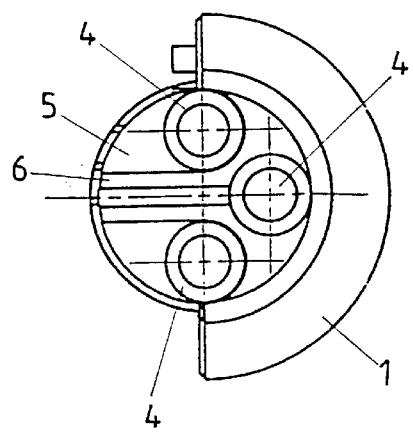
FIG. 3 is a rearview of the MID support of FIG. 2.

The embodiment illustrated in FIG. 10 corresponds to the embodiment according to FIG. 1 wherein however the sealing compound 16 enclosing the electronic components has been eliminated. This is possible without damaging the electronic components during injection molding by employing an injection molding process with relatively low temperatures and pressures. Such a method is, in particular, suitable in connection with a soft plastic material component 15 which in this embodiment is injection-molded about the MID support as the further plastic component. With this soft plastic material component a bead 17 is formed which surrounds the ignition device along the outer periphery and acts as a seal when the ignition device is inserted into a cylindrical connecting socket of a drive device for a restraining device in a motor vehicle. With this seal, penetration of moisture into the propellant charge of the drive device for triggering the ignition device is prevented.

The large surface area metallization, which can be seen in particular in FIGS. 2 through 5, serves furthermore as a moisture protection in order to substantially prevent the penetration of moisture into the powder chamber 8. When a large surface area metallization is not present, such a penetration of moisture can happen by the moisture being taken up by the plastic material and then diffusing outwardly again. A surface metallization of the plastic material prevents however such an uptake and the evaporation of moisture. In particular, the large surface metallization of the back wall 11 of the powder chamber 8 as well as the large surface metallization of the back wall 18 of the MID support, on which the connector pins are arranged, prevents to a high degree a diffusion of moisture in the longitudinal direction of the ignition device.

In FIGS. 11 and 12 further embodiments of the connector pins formed as unitary parts of the MID support are shown on the rearward end of the MID support. In the embodiment illustrated in FIG. 11, a single connector pin 4 is provided which comprises several metallized areas 5 with intermediately positioned insulating areas 6. These metallized areas 5 electrically connected with the electronic components 2 can be contacted with a connecting plug that can be placed onto the connector pin 4 by means of corresponding contact springs.

In the embodiment illustrated in FIG. 12 the connector pins 4 are trough-shaped wherein in the trough-shaped depression of the connector pins 4 metallized areas 5 are formed, respectively. Connecting wires can be soldered into these through-shaped areas of the connector pins 4 which can be again provided with corresponding plugs at their oppositely positioned free ends. When embedding the MID support by injection molding with the further plastic material component, the trough-shaped connector pins 4 with the soldered connecting wires 13 are advantageously also embedded.

Instead of the injection-molded encasement 14 of the MID support with the further plastic component, a housing cover could be arranged on the MID support which optionally can also be used in connection with a sealing compound.

Instead of the described type of manufacture of the MID support, an MID support prepared according to another known technology could be employed.

While specific embodiments of the invention have been shown and described in detail to illustrate the inventive principles, it will be understood that the invention may be embodied otherwise without departing from such principles.

What is claimed is:

1. An ignition device for triggering a restraining device of a motor vehicle, the ignition device comprising:
   an MID support having a forward end and a rearward end;
   electronic components mounted on the MID support;
   an ignitor arranged at the forward end of the MID support;
   the MID support comprising at least one unitary connector pin having at least one metallized area configured to contact the electronic components.

2. The ignition device according to claim 1, wherein the ignitor is selected from the group consisting of an ignition cap and an ignition resistor arranged in a powder chamber filled with a pyrotechnical powder.

3. The ignition device according to claim 1, wherein the MID support has two of the unitary connector pins each having one of the metallized areas.

4. An ignition device for triggering a restraining device of a motor vehicle, the ignition device comprising:
   an MID support having a forward end and a rearward end;
   electronic components mounted on the MID support;
   an ignitor arranged at the forward end of the MID support;
   the MID support comprising at least one unitary connector pin having at least one metallized area configured to contact the electronic components;
   wherein the MID support has only one of the unitary connector pins having two or more of the metallized areas separated from one another by insulating areas.

5. The ignition device according to claim 1, wherein the ignitor is an ignition resistor arranged in a powder chamber filled with a pyrotechnical powder, wherein the powder chamber has a wall and wherein at least a part of the wall is a unitary part of the MID support.

6. The ignition device according to claim 1, comprising a plastic material component connected by injection-molding to the MID support.

7. The ignition device according to claim 6, further comprising a sealing compound separating the electronic components on the MID support from the plastic material component.

8. An ignition device for triggering a restraining device of a motor vehicle, the ignition device comprising:
   an MID support having a forward end and a rearward end;
   electronic components mounted on the MID support;
   an ignitor arranged at the forward end of the MID support;
   the MID support comprising at least one unitary connector pin having at least one metallized area configured to contact the electronic components;
   a plastic material component connected by injectionmolding to the MID support;
   wherein the plastic material component is a soft plastic material component forming a peripheral bead annularly extending about an exterior side of the ignition device and forming a seal.

9. The ignition device according to claim 1, wherein two or more of the metallized areas are separated from one another by insulating areas, wherein a surface area of the metallized areas is significantly greater than a surface area of the insulating areas.

10. An ignition device for triggering a restraining device of a motor vehicle, the ignition device comprising:
    an MID support having a forward end and a rearward end;
    electronic components mounted on the MID support;
    an ignitor arranged at the forward end of the MID support;
    the MID support comprising at least one unitary connector pin having at least one metallized area configured to contact the electronic components;
    wherein the ignitor comprises a powder chamber filled with a pyrotechnical powder, wherein the MID support forms a rear wall of the powder chamber, wherein at least one of a first surface of the MID support facing the powder chamber and a second surface of the MID support facing away from the powder chamber is provided with the at least one metallized area over a preponderant portion of the surface area of the at least one of the first and second surfaces.

11. The ignition device according to claim 10, wherein the rear wall is disk-shaped and wherein the at least one of the first and second areas is provided with metallized areas over more than 80% of the surface area.

12. The ignition device according to claim 1, wherein the metallized areas are electro-plated onto the MID support.

13. An ignition device for triggering a restraining device of a motor vehicle, the ignition device comprising:
    an MID support having a forward end and a rearward end;
    electronic components mounted on the MID support;
    an ignitor arranged at the forward end of the MID support;
    the MID support comprising at least one connector pin forming a unitary part of the MID support and comprised of a plastic material component metallizable by electroplating, wherein the connector pin has at least one metallized area configured to contact the electronic components.

* * * * *